US008108257B2

(12) United States Patent
Sengamedu

(10) Patent No.: US 8,108,257 B2
(45) Date of Patent: Jan. 31, 2012

(54) DELAYED ADVERTISEMENT INSERTION IN VIDEOS

(75) Inventor: Srinivasan H. Sengamedu, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 981 days.

(21) Appl. No.: 11/877,008

(22) Filed: Oct. 23, 2007

(65) Prior Publication Data
US 2009/0070206 A1  Mar. 12, 2009

(30) Foreign Application Priority Data

Sep. 7, 2007 (IN) .......................... 1899/DEL/2007

(51) Int. Cl.
*G06Q 40/00* (2006.01)
(52) U.S. Cl. .................................. 705/14.73; 705/14.72
(58) Field of Classification Search ................... 705/14, 705/14.72, 14.73
See application file for complete search history.

(56) References Cited

U.S. PATENT DOCUMENTS

| | | | |
|---|---|---|---|
| 6,154,771 A | 11/2000 | Rangan et al. | |
| 6,654,933 B1 * | 11/2003 | Abbott et al. | 715/203 |
| 6,986,153 B1 * | 1/2006 | Ridderheim et al. | 725/32 |
| 6,996,775 B1 | 2/2006 | Dey et al. | |
| 7,272,780 B2 * | 9/2007 | Abbott et al. | 715/203 |
| 7,613,691 B2 * | 11/2009 | Finch | 1/1 |
| 7,982,797 B2 * | 7/2011 | Zhang | 348/423.1 |
| 2002/0016965 A1 * | 2/2002 | Tomsen | 725/42 |
| 2002/0083469 A1 | 6/2002 | Jeannin | |
| 2003/0145320 A1 * | 7/2003 | Vogel | 725/22 |
| 2004/0064831 A1 * | 4/2004 | Abbott et al. | 725/1 |
| 2006/0277470 A1 | 12/2006 | Schneider et al. | |
| 2007/0101374 A1 | 5/2007 | Sherman | |
| 2007/0118425 A1 * | 5/2007 | Yruski et al. | 705/14 |
| 2007/0157231 A1 | 7/2007 | Eldering et al. | |
| 2007/0204310 A1 | 8/2007 | Hua | |
| 2008/0040666 A1 * | 2/2008 | Wang et al. | 715/526 |
| 2008/0127244 A1 * | 5/2008 | Zhang | 725/32 |
| 2008/0155589 A1 * | 6/2008 | McKinnon et al. | 725/34 |
| 2008/0307454 A1 * | 12/2008 | Ahanger et al. | 725/36 |

(Continued)

FOREIGN PATENT DOCUMENTS

WO  WO 01/84440  11/2001

OTHER PUBLICATIONS

Helft, Miguel, Google Aims to Make YouTube Profitable With Ads, Aug. 22, 2007, The New York Times.*

(Continued)

*Primary Examiner* — Jagdish Patel
*Assistant Examiner* — Kevin Poe
(74) *Attorney, Agent, or Firm* — Hickman Palermo Truong & Becker LLP

(57) ABSTRACT

A method for achieving uninterrupted interactivity for user watching a video yet clicking on an advertisement is provided. A method for delayed interactivity is provided herein. Delayed interactivity is implemented in the form of delayed insertions. When a user clicks on an object in hypervideo, presentation of or any action on the related information is deferred rather than played immediately. Delayed interactivity also is implemented in the form of video bookmarks. When a user clicks on an actual advertisement, related information is stored, i.e., bookmarked, along with video content. In this way, the user can pursue the related information at a later time and at the user's convenience.

18 Claims, 3 Drawing Sheets

U.S. PATENT DOCUMENTS

| | | | |
|---|---|---|---|
| 2009/0007172 A1* | 1/2009 | Ahanger et al. | 725/36 |
| 2009/0013347 A1* | 1/2009 | Ahanger et al. | 725/36 |
| 2010/0070993 A1* | 3/2010 | Wachtfogel et al. | 725/32 |

OTHER PUBLICATIONS

International Search Authority, "Notification of Transmittal of the International Search Report and the Written Opinion of the International Search Authority, or the Declaration," Mar. 24, 2009, 11 pgs.
Current Claims for PCT/US2008/075359, 3 pgs.
Cai, C., et al., "TRECVID2005 Experiments in The Hong Kong Polytechnic University: Shot Boundary Detection Based on a Multi-Step Comparison Scheme", In TRECVID Workshop, NIST Special Publication, 2005, 11 pages.
Slaney, M., et al., "Multimedia edges: finding hierarchy in all dimensions", In Proceedings of the Ninth ACM international conference on Multimedia, 2001, 12 pages.
Karp, Scott, "YouTube's New InVideo Ad Format Is Not Google AdWords", Publishing 2.0—The® Evolution of Media, Aug. 22, 2007, 3 pages.
Martin, Hugo E., "Hugo E. Martin on Media, Marketing and Internet", A Bilingual Blog, Subjective and incomplete, printed Sep. 4, 2007, 3 pages.

Helft, Miguel, "Google Aims to Make YouTube Profitable With Ads", New York Times, nytimes.com, 2007, 2 pages.
Slaney M et al: "multimedia Edges: finding Hierarchy in all dimensions" Proceedings/ ACM Multimedia 2001, [$9^{th}$ ACM International Conference on Multimedia], Sep. 30, 2001 pp. 29-40 XP002295016 Assoc for computing machinery, US DOI: 10.1145/50014 ISBN: 978-1-58113-394-3.
Cai C et al: "TRECVID2005 Experiments in the Honk Kong Polytechnic University: Shot Boundary Detection Based on Multi-Step Comparison Scheme" [Online] Nov. 14, 2005, pp. 1-11 XP002595241 *National Institute of A Standards and Technology*.
European Search Report EPO Application No. 08829555.5 dtd Oct. 8, 2010, 10 pages.
Current Claims for EPO application No. 08829555.5, 4 pages.
Australian Application No. 2008296144, "Examiner's first report", dated Oct. 15, 2010, 2 pages.
Current Claims for AU application No. 2008296144, 3 pages.
State Intellectual Property of the People's Republic of China, "First Office Action" Chinese Application No. 200880105985.7, dated Mar. 15, 2011, 6 pages.
Current Claims for Chinese application No. 200880105985.7, 3 pages.

* cited by examiner

DELAYED ADVERTISEMENT INSERTION IN VIDEOS

CROSS-REFERENCE TO RELATED APPLICATION

This application is related to and claims the benefit of priority from Indian Patent Application No. 1899/DEL/2007 filed in India on Sep. 7, 2007, entitled "DELAYED ADVERTISEMENT INSERTION IN VIDEOS"; the entire content of which is incorporated herein by this reference thereto and for all purposes as if fully disclosed herein.

FIELD OF THE INVENTION

The present invention relates to multimedia processing and, more particularly, to interactive video processing.

BACKGROUND

Videos and video advertisements are the next wave of technologies on the Internet. This phenomenon has several dimensions: broadband network connections making video viewing possible on the Internet, advertisements displayed in video format, popularity of user generated video content, contextual advertisements, etc.

The notion of advertisement insertion in videos is an area of interest. More specifically, the notion of advertisement insertion in user-generated video content is of interest as well as the notion of advertisement insertion in premium content. Premium content refers to content created by a professional for a professional purpose, such as content from a commercial movie.

The points in a video program stream where a switch can be made to another program are referred to herein as insertion points. When the program to be inserted is an advertisement, the insertion points are referred to herein as advertisement insertion points. Presently, advertisement insertion points in premium content are determined manually.

A dominant theme of the Internet is interactivity. Users now expect advertisements on the Internet to be interactive or clickable. A clickable video is referred to as a hypervideo. The clickable regions on a hypervideo are referred to as video hotspots. Hence, hypervideo is based on the premise that regions or objects in a video should be made clickable. Just as a user clicks hypertext, a user clicking on a hotspot can lead to new or further information. Typically, such information is in the form of video, web page, email address, and so on.

It should be appreciated that video viewing is a temporal experience for the user. That is, typically, the video has a beginning, middle, and end. A user starts the video at the beginning and plays the video through until the end. Consider a situation where, in addition to a video playing on a display, a link to an advertisement video, advertisement web page, or the like is presented to a user. The user may be interested in clicking the hotspot or the link to the web page, etc. However, if the user clicks the hotspot or the link to the web page, then the advertisement video associated to the hotspot or the web page associated with the link is immediately displayed to the user. The displaying video advertisement or the displayed web page and the like necessarily interrupt or disturb in some manner the user's temporal experience of viewing the video stream. For example, the video advertisement can temporarily replace the video which the user was watching, until the video advertisement is finished. In another example, the video advertisement can be played on a different region on the display, while the first video stream continues to play. It should be appreciated that clicking a hotspot or link to a web page interrupts the temporal experience of the user watching the video stream. It may even be that the user is interested in viewing the advertisement or in linking to an associated web page. However, most likely, the user is more interested in the presently displaying video stream. Hence, it should be appreciated that in certain configurations where videos are clickable for playing an advertisement or a link is presented, a user typically will not click the videos hotspots or the link to the advertisement. The user typically does not want to interrupt the video. Clicking the video or the video advertisement is likely to result in loss of continuity.

Google™ recently introduced an overlay advertisement format ("overlay ad format") as an interactive indicator. The functionality of Google's overlay ad format is described in The New York Time's online article, "Google Aims to Make YouTube Profitable With Ads" by Miguel Helft, dated Aug. 22, 2007. In the article, the advertisement appears 15 seconds after a user begins to watch a video clip. The advertisement overlays the bottom fifth of the user's screen. The overlay is similar to headline tickers displayed during television news programs. With the advertisement overlay, the user can ignore overlay and it will disappear after about 10 seconds. The user can close the advertisement overlay. Or, the user can click on the advertisement overlay. When the user clicks on the advertisement overlay, the video the user was watching stops and a video advertisement associated with the advertisement overlay starts playing. When the advertisement finishes playing, or if the user clicks on a box to close the advertisement, then the original video resumes playing from the point where it had stopped playing.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
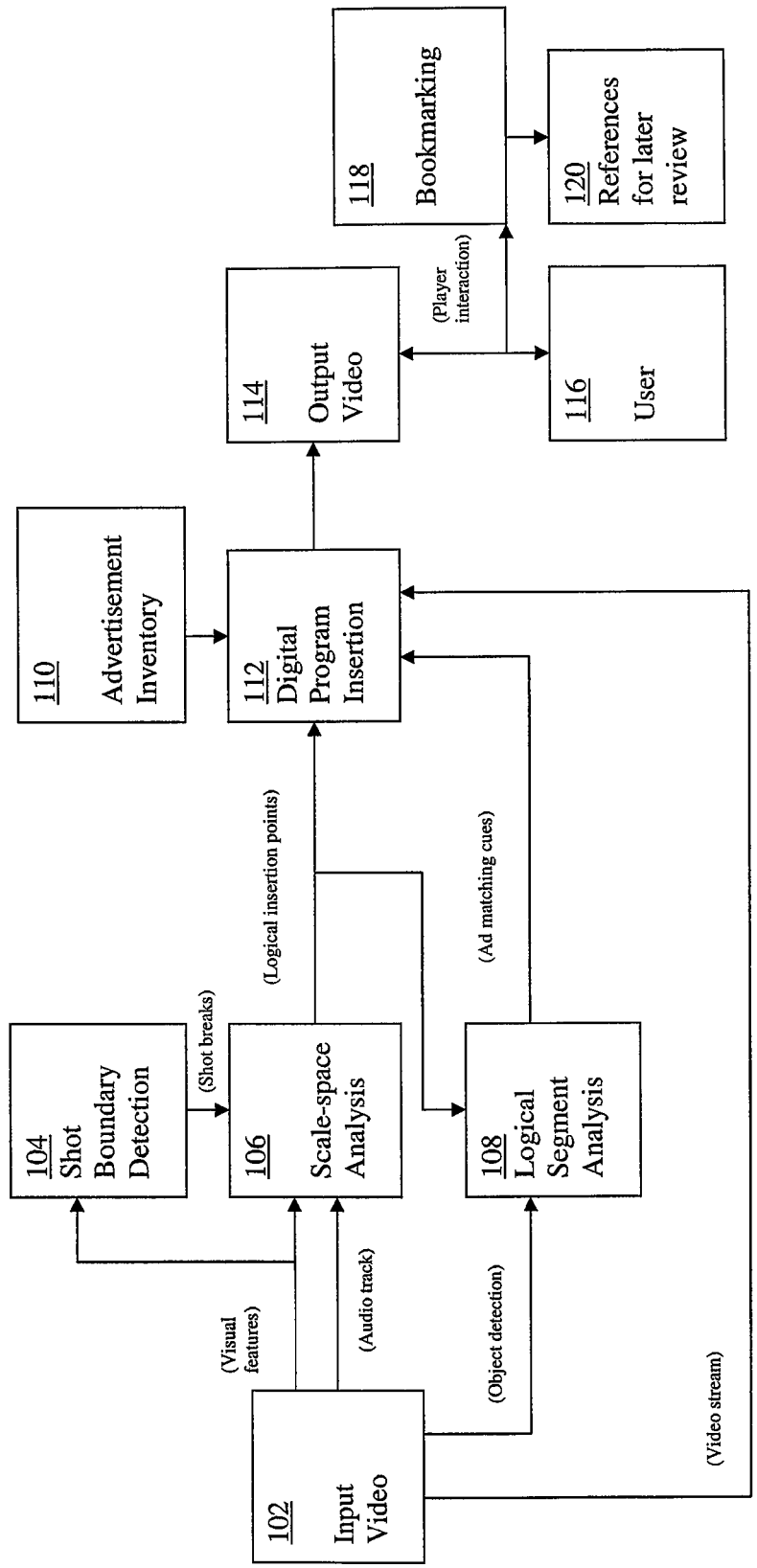
FIG. 1 is a schematic diagram showing components of an embodiment of a delayed interactive video architecture.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A method and process for achieving uninterrupted interactivity for a user watching a video and yet clicking on the video or an advertisement is provided. A method and process for delayed interactivity is provided herein. In an embodiment, delayed interactivity is implemented in the form of delayed insertions. When a user clicks on an object in hypervideo, presentation of or any action on the related information is deferred rather than played or presented immediately. In an embodiment, to achieve deferred action resulting from a click in hypervideo, advertisements are placed at logical insertion points. An example of a logical insertion point for inserting an advertisement in a movie video is a point corresponding to a scene change.

Delayed interactivity also is implemented in the form of video bookmarks. When a user clicks on a hypervideo or when a user clicks on an actual advertisement, related information is stored, i.e., bookmarked. In an embodiment, the related information is stored along with video content. By bookmarking related information, the user can pursue the related information at a later time and at the user's convenience.

AN EXAMPLE

For example, a user can be watching a video on James Bond and click on the car that James Bond is driving because the user desires information on the car. However, under some previous approaches, clicking the car that James Bond is driving interrupts the flow of the James Bond video. The essence of a video such as the James Bond video and many other types of videos is temporal in nature. Hence, any interactive paradigm for video should not conflict with the temporal continuity of the video.

If the ardent James Bond fan is indeed interested in the contraptions James Bond uses, such as James Bond's car, then interaction should be permitted. However, the interaction should not immediately interrupt the flow of video. In an embodiment, delayed interactivity is applied so as not to interrupt immediately the flow of the James Bond video. Delayed interactivity herein means the user interacts with, e.g., clicks on, a video, and the effect of the interaction is delayed.

In an embodiment, the amount of delay is application-specific. In an embodiment, the relevant information is played at a next available advertisement point. In another embodiment, the interaction is bookmarked. When a user bookmarks the interaction, the user can view the information at a later time and at the user's convenience.

As an example, if the user clicks on James Bond's car, a URL and an 800 phone number can be stored on the user's machine in a file. At a later point in time, the user may desire to link to the URL or perhaps call the 800 phone number. At that later point in time, the user retrieves the bookmark. That is, the user, through normal file access operations, opens the file and links to the URL or calls the 800 phone number. It should be appreciated that a bookmark can be retrieved in any number of ways. For example, a bookmark can be retrieved automatically based on a predetermined timer. In another implementation, the URL and the 800 phone number are added to a file already created on the client's machine. In this embodiment, the file contains a list of bookmarks. At the later point in time, the user, through normal user interface functionality, opens the file which displays the list of bookmarks and retrieves the bookmark of interest from the list.

Two implementations of delayed interactivity, delayed insertion and video bookmarks, are described in further detail hereinbelow.

Delayed Advertisement Insertion in Videos

In an embodiment, a collection of advertisement points are provided. Advertisement points are points in a video stream that divide the video stream into logical segments from a user's perspective. An advertisement point is a logical place in the video stream where an advertisement video or other related information can be inserted.

In an embodiment, a technique is used in determining the collection of advertisement points. The technique is shot boundary detection coupled with scale space analysis (SSA). A shot is an uninterrupted sequence of frames captured through continuous camera motion. The transition from one shot to another shot can be abrupt or gradual, resulting in a shot boundary. It is logical that an advertisement should not be played while a shot is still on. Hence, in an embodiment, shot boundaries are used as in part as a basis for locating advertisement placement positions. The scale-space analysis technique analyzes a signal at multiple scales giving robustness to false breaks arising from temporally local changes like sudden flash lights, impulse noise, etc. Furthermore, SSA has the power to group similar shots, bringing out only significant scene transitions.

Shot boundary detection is an extensive research area. A number of techniques have been devised to find shot boundaries. For example, C. Cai, K. M. Lam, and Z. Tanb, in "TRECVID2005 Experiments in The Hong Kong Polytechnic University: Shot Boundary Detection Based on a Multi-Step Comparison Scheme," and in "TRECVID Workshop, NIST Special Publication, 2005," describe a shot boundary detection technique using multi-step frame comparison. Each of these documents is incorporated herein in its entirety by this reference thereto.

An example scale-space analysis technique is described by M. Slaney, D. Ponceleon, and J. Kaufman, "Multimedia edges: finding hierarchy in all dimensions," in Proceedings of the Ninth ACM international conference on Multimedia, pages 29-40, 2001, the entirety of which is incorporated herein by this reference thereto. M. Slaney, D. Ponceleon, and J. Kaufman essentially describe a framework for segmenting video by analyzing audiovisual properties at multiple scales. Segmentation boundaries are described as significant global transitions in the video.

As can be gleaned from the above, detecting shot breaks is simply a first step in identifying advertisement insertion positions, as not all shot breaks are suitable candidates for advertisement placement. For example, a dialog between two actors in a movie keeps the camera shifting focus from one actor to other, resulting in several shot breaks within a single dialog. However, placing an advertisement at any of such insertion points (shot breaks) is inappropriate and will only irritate the audience. Hence, it is desirable to apply the notion of scene breaks which will reject within-scene shot breaks to retain only the breaks representing significant transitions between different scenes. In an embodiment, retaining the breaks representing significant transitions between different scenes can be achieved by filtering the output of the shot boundary technique using scale-space analysis as discussed hereinabove.

Furthermore, in another embodiment, video content analysis is used to identify appropriate advertisements to correspond to the advertisement points. For example, an identified advertisement can be based in part on anticipated user interests. If a user clicks on an object while viewing a video, then the user's interest is clear. From the clear indication that the user is interested in the object, an appropriate advertisement is identified. The identified advertisement is not necessarily played at the time the user clicks on the object. Instead, the identified advertisement is played at the next available sensible advertisement point. In this manner of playing the identified advertisement at the next sensible advertisement point, the continuity of the video and the temporal nature of the video are preserved.

It should be appreciated that as a user gains more experience with the result of delayed advertisement insertion, the user becomes more confident that the requested information of the user and/or the showing of the advertisement will occur at an appropriate time, as opposed to the display of the requested information and/or advertisement interrupting the video. Hence, as the user's confidence solidifies or increases, the user is inclined to click on hypervideos or video advertisements more frequently.

Bookmarking in Videos

An embodiment of video bookmarking can be described by way of example as follows. A user clicks on a hotspot on a hypervideo. In response, a corresponding video advertisement containing a URL is played—not necessarily immediately, but at the next appropriate advertisement point. A hotspot is a region on a video display that is selectable in some manner, such as through mouse clicking. In this example, the user does not desire to link to the URL that is displayed in the video advertisement. It may be that the user does not desire to visit the web page associated with the URL at that time. Nevertheless, in this example, information in the video advertisement, as well as information relating to the URL and the corresponding web page, is important to the user. Hence, in this example and according to an embodiment, the act of clicking on the URL hotspot results in the saving of the information related to the video advertisement, the URL, and the associated web page.

The act of saving the information related to a video stream and other related information, such as the URL, is referred to as "bookmarking" the information. In an embodiment, the information to be bookmarked can be obtained from an associated data file or data stream. An example of an associated data stream is an XML stream. In an embodiment, a bookmark can contain URLs, phone numbers, digital images, and the like. In another embodiment, a bookmark can be added to a pre-existing list of bookmarks.

Bookmarks are retrievable at the user's convenience. Bookmarks can be retrievable at a later point in time than from when the bookmark was stored. In one embodiment, the user retrieves a bookmark through normal file system operations, such as by opening a bookmark file stored locally or remotely. In another embodiment, a bookmark can be retrieved by the user opening a list of bookmarks and selecting the bookmark of interest by, for example, normal file system operations or by normal user interface functionality.

An Exemplary Delayed Interactivity Architecture

An example delayed interactivity architecture is described with reference to FIG. 1. FIG. 1 is a schematic diagram showing components of an embodiment of a delayed interactive video system and process. Initially, ad insertion points are selected using a combination of shot boundary detection and scale-space analysis of the video. The detected advertisement insertion points divide the video into logical segments. The segments are analyzed to determine various factors. For example, the presence of brands or celebrities can be determined. The presence of brands or celebrities can help create metadata for choosing contextual advertisements. In one embodiment, the advertisement positions coupled with the created metadata are sent to a program insertion module where appropriate advertisements are inserted in the video.

The insertion can be based on pre-determined business rules as well as automatically generated metadata. It should be appreciated that in other embodiments, the process of generating metadata and the advertisement insertion process can be done by separate vendors. When the user is watching the video, the proposed video player features facilitate delayed interaction upon any interactive event like clicking on a hotspot or clicking on an advertisement. Further details are discussed hereinbelow.

A digital video or a piece of a digital video ("video stream") is input over a network into an input video module 102 on a server. Input video module 102 extracts visual features and audio tracks from the input video stream. The extracted visual features are sent to a shot boundary detection module 104 and are also sent to a scale-space analysis module (SSA) 106. The extracted audio tracks are also sent to SSA module 106. The input video stream is sent to a digital program insertion module 112. Input video module 102 extracts object detection data and sends object detection data to a logical segment analysis module 108. Objection detection data is data that identifies an object. An example of an object is a face of a celebrity, such as the face of Tiger Woods. Object detection data contains data representing the face of a celebrity. In this way, object detection data can be used to search for and find advertisements related to the object, for example, more advertisements related to Tiger Woods.

Shot boundary detection module 104 determines shot points ("shot breaks") and sends the determined shot breaks to SSA 106. SSA 106 analyzes the sent visual features, the sent shot breaks, and the sent audio tracks, and determines logical insertion points therefrom. The determined logical insertion points are sent to digital program insertion module 112 and are also sent to logical segment analysis module 108. In an embodiment, at logical segment analysis module 108, for each determined logical insertion point, neighboring video segments are further analyzed to extract cues for advertisement matching. Advertisement matching is the process of selecting advertisements based either on profiles of a target audience (behavioral targeting) or on video content. In the embodiment depicted in FIG. 1, logical segment analysis module 108 determines advertisement matching cues at least in part from received object detection data and from received logical insertion points. Logical segment analysis module 108 sends the advertisement matching cues to digital program insertion module 112. In an embodiment, logical segment analysis module 108 bundles the advertisement matching cues with the logical insertion points and sends the bundle to digital program insertion module 112.

As an example implementation, in an embodiment, logical segment analysis module 108 performs advertisement matching cue extraction based on recognition of actors or sportspersons in the input video stream. Possibly, the advertisements endorsed by the same personality may have a greater impact on the audience.

Digital program insertion module 112 interacts over a network with an advertisement inventory repository 110. Digital program insertion module 112 receives advertisements to insert from advertisement inventory repository 110. As well, digital program insertion module 112 inserts the received advertisements at appropriate points in the input video stream. In an embodiment, digital program insertion module 112 determines which advertisement to insert and where to insert the advertisement based at least in part on advertisement matching cues received from logical segment analysis module 108 or from other business logic. In an embodiment, digital program insertion module 112 generates metadata related to the inserted advertisements. For example, generated metadata can be an XML file containing a URL associated with the advertisement. As well, in an embodiment, to make transitions between video and advertisements more explicit, digital program insertion module 112 can introduce fade-to-black effect at logical insertion points.

Digital program insertion module 112 outputs an output video stream with inserted advertisements at logical insertion points. Digital program insertion module 112 also places the output video stream to an output video store 114. In an embodiment, digital program insertion module 112 also outputs, either alone or along with the output video stream, generated metadata. Output video store 114 is accessible to a user 116 when user 116 desires to view the output video.

The output video stream at least contains the input video stream. In an embodiment, the output video stream is embedded with one or more advertisements at logical insertion points. In another embodiment, in addition to the output video stream being embedded with one or more advertisements at logical insertion points, metadata containing data that is related to the one or more advertisements is coupled to the output video stream. An example of metadata coupled to the output video stream is a file containing a URL and an email address.

Ways of implementing the provisioning of a video stream to a user for playing and for providing advertisements to be played at logical insertion points are numerous and are within the spirit and scope of the delayed interactivity discussed herein. For example, in accordance with an embodiment, a script in a video player reads in a video stream and an XML file corresponding to the video stream. When an advertisement point is encountered, either a contextual advertisement determined from associated metadata or a predetermined advertisement based on business logic commences playing. While the advertisement is playing, the state of the present active video stream is retained. On the completion of the advertisement, the video stream resumes playing from its previous state. In other words, a logical segment of the video stream has played, then the advertisement plays, and then the video stream resumes playing by playing the next logical segment of the video stream.

In another embodiment, user 116 accesses the output video stream from output video store 114. As well as viewing the output video stream, a visual indicator associated with an advertisement is displayed for user 116. For example, user 116 can be watching a video on Tiger Woods. Above the Tiger Woods video may be a product display region showing the name of a product. In this embodiment, user 116 clicks the product display region while the Tiger Woods video is playing. Instead of the Tiger Woods video being interrupted at the time user 116 clicks the product display region, the Tiger Woods video continues to play until a next sensible advertisement point. When the Tiger Woods video reaches the next sensible advertisement point, an advertisement for the product is displayed. The advertisement can be another video, a hyperlink to a web page, contact information, and so on.

In an embodiment, user 116 is watching an advertisement that is played at an advertisement point when user 116 desires more information. User 116 clicks on the advertisement or clicks on a region thereof (hotspot). When user 116 clicks the advertisement or a hotspot on the advertisement, data associated with the advertisement is bookmarked, i.e., stored in a bookmark storage unit 118. Bookmark storage unit 118 can reside locally on the user's system. In another embodiment, bookmark storage unit 118 is stored remotely on a server. In an embodiment, bookmark storage unit 118 stores reference data 120, for example in a file, where the stored reference data contains data or references to data to be played, displayed, or accessed by any other manner for review, at a later time.

In another embodiment, after user 116 clicks a hotspot, the relevant information is stored or bookmarked on the user's system. For example, user 116 can click on a hotspot and shared objects in Macromedia Flash can be used to bookmark the relevant information on the user's system. In this example, delayed interactivity is achieved by playing the advertisement on the occurrence of the next sensible advertisement point. In one implementation, the entire video frame is a hotspot. In this implementation, an advertisement point file also contains the data to be bookmarked. Hence, downloading the video enables a modular transfer of bookmark information. Further in this example, a previous configuration of the video reflects dividing each video frame into different hotspots, each hotspot associated with bookmark information that may be different from bookmark information for another hotspot.

An Exemplary Delayed Interactivity Process Flow

Figure 2:
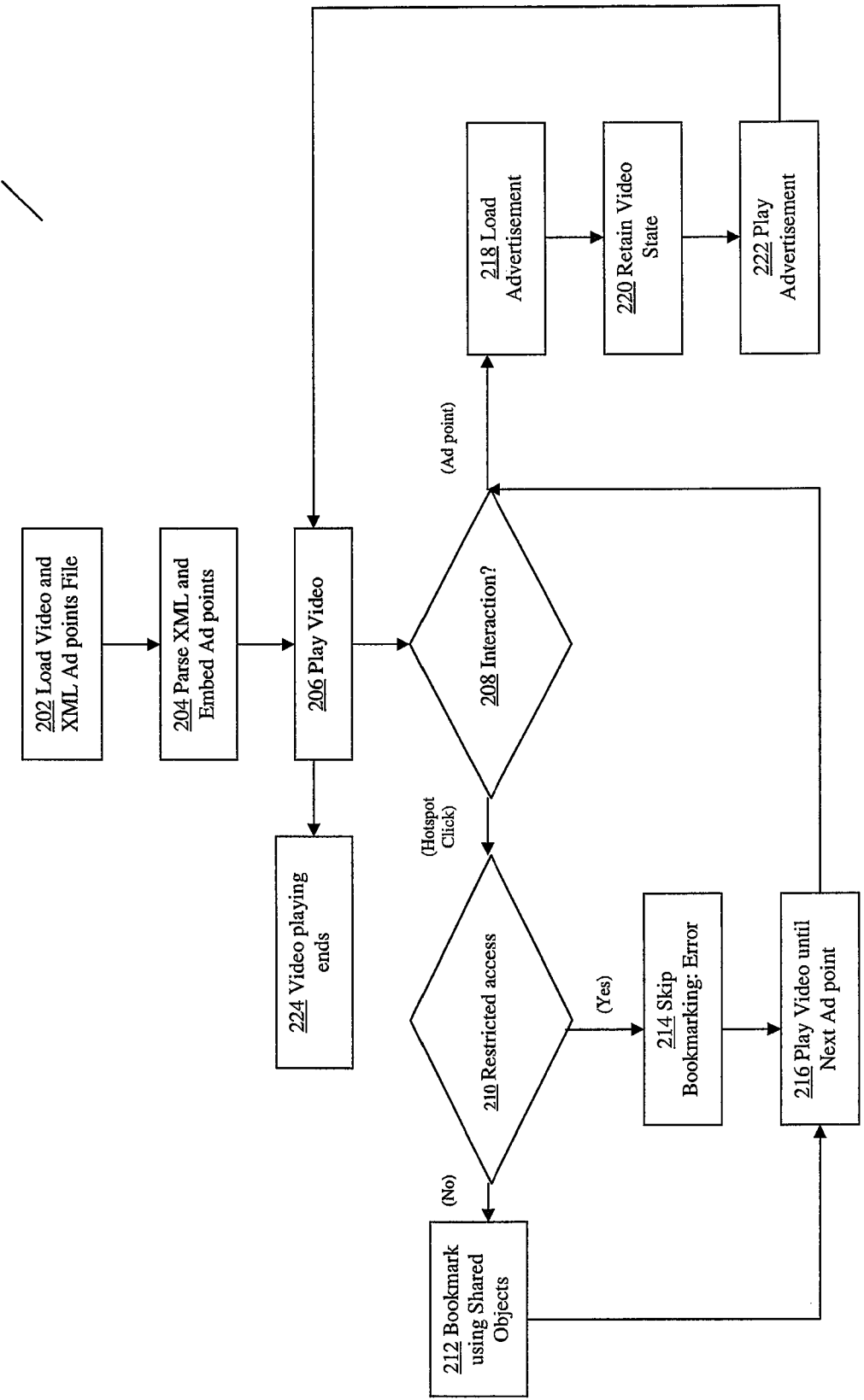
FIG. 2 is a flow diagram showing a video player script according to an embodiment.

An exemplary delayed interactivity process is described with reference to FIG. 2, which is a flow diagram showing a video player process flow (200) according to an embodiment. According to the video player process flow (200), when a user is watching the video, any interactive event such as clicking on a hotspot or clicking on an advertisement leads to delayed action. It should be appreciated that the details of the embodiment described hereinbelow are by way of example only and are not meant to be limiting.

Video player process flow (200) begins with a video stream and an XML advertisement points file containing logical advertisement insertion points being loaded into a video player (202). The video player parses the XML advertisement points file to extract advertisement points. The video player embeds the extracted advertisement points into the video stream (204). The video player plays the video stream with embedded advertisement points (206).

If there is no user interaction (208), then at an appropriate advertisement point, the video player uploads an advertisement (218). The video player retains the state of the video stream (220). For example, video player can retain the state of the video stream by storing the state of the video stream in a local cookie. After or while storing the state of the video stream, the video player plays or displays the advertisement (222). It should be appreciated that the advertisement can be a video stream as well. The advertisement can be a hyperlink to a web page. Such examples are meant by way of illustration only and are not meant to be limiting. At some temporal point after the advertisement is played, the video player uses the state of the video stream to continue playing the video stream. In this way, the advertisement is inserted at a logical advertisement point, such that the user does not experience a loss of continuity while watching the video stream. The user is shown an advertisement at a logical point in the video stream, such as after a scene in a movie.

If the user interacts with the video, such as by clicking a hotspot, then the video player bookmarks data related to the video stream (212). In an example implementation, the video player is a Flash video player. The Flash video player checks whether a user's security policy allows data related to the video stream to be stored locally on the user's system (210). Specifically, in the example implementation, the Flash video player determines whether access to the user's system is restricted (210). If access to the user's system is not restricted, then the Flash video player bookmarks data related to the video stream using, in part, shared objects (212). Otherwise, the Flash video player skips the bookmarking step (214). The Flash video player performs appropriate error handling. It should be appreciated that before, during, and after the user clicks the hotspot, the video stream continues to play without visual interruption to the user.

In both cases, when data related to the video stream is bookmarked (212) and when video player skips the bookmarking step (214), the video continues to play until the next advertisement point (216). If there is not a next advertisement point, then the video plays until the end (224). At any time while the video is playing and when hotspots are available on the video stream for the user, the user can click any hotspot and return control to the video player that detects a hotspot click (208).

Hardware Overview

Figure 3:
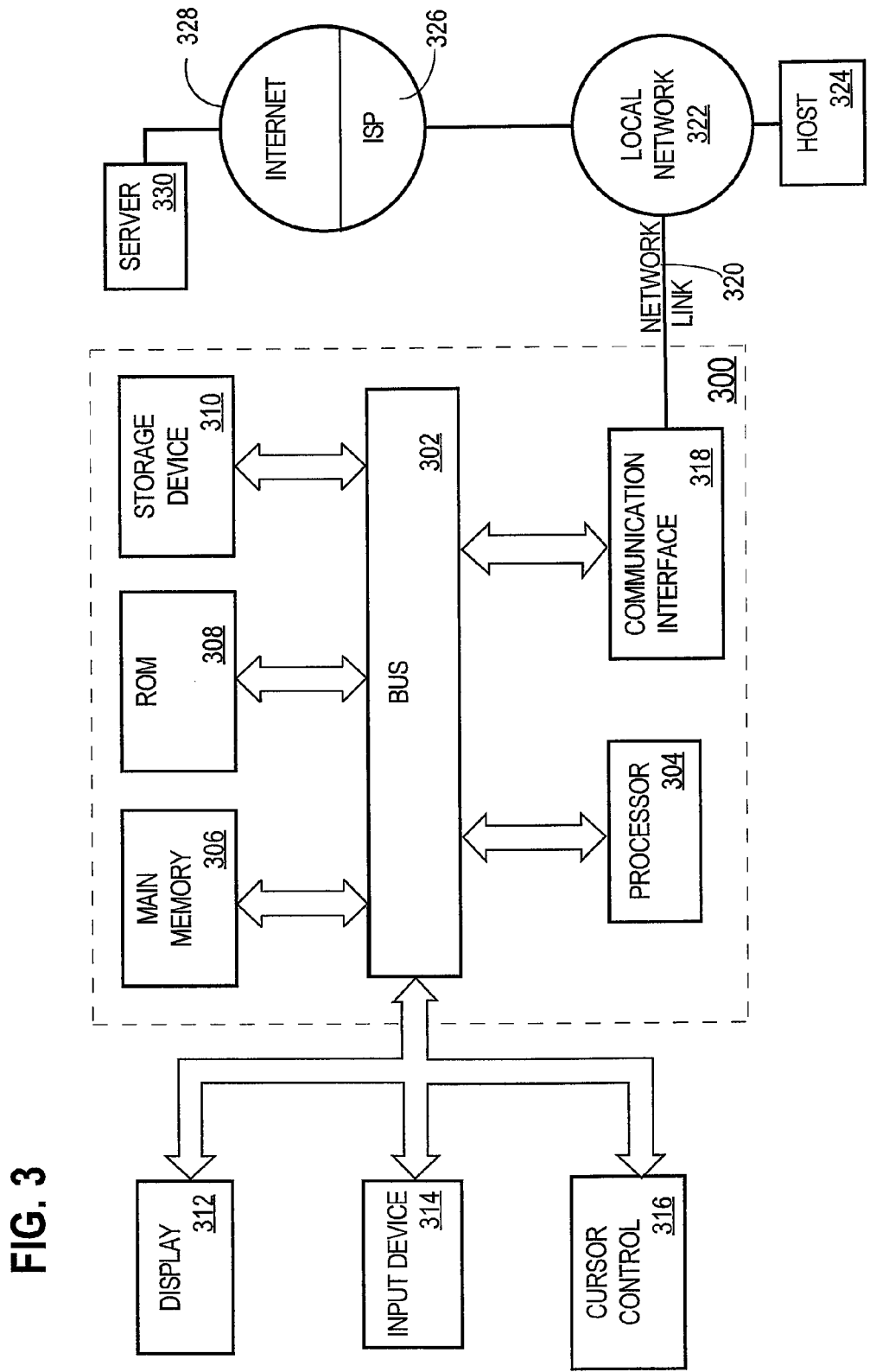
FIG. 3 is a block diagram that illustrates a computer system upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for delayed advertisement insertion, comprising:
    identifying one or more advertisement insertion points in a video stream, wherein an advertisement insertion point is a point in the video stream between two video segments wherein, when the video stream is played, the first of the two video segments occurs before the advertisement insertion point and the second video segment occurs after the advertisement insertion point;
    generating instructions for and providing the instructions to a video player for when playing the video stream that causes the video player to:
        provide an interactive indicator on a display, wherein the interactive indicator is coupled to an associated advertisement;
        in response to a user interacting with the interactive indicator while the video stream is playing:
            (a) determine an available advertisement insertion point;
            (b) delay playback of the associated advertisement until the available advertisement insertion point;
        wherein delaying playback comprises continuing to play the video stream until the available advertisement insertion point; and
        play the associated advertisement at the available advertisement insertion point;
    wherein the steps of the method are performed by one or more computing devices.

2. The method recited in claim 1, wherein identifying one or more advertisement insertion points is based in part on shot boundary detection or scale-space analysis.

3. The method recited in claim 1, further comprising associating an advertisement from a set of one or more advertisements with each of the advertisement insertion points, wherein associating an advertisement from a set of one or more advertisements is based in part on using profiles of target audiences or on content of the video stream.

4. The method recited in claim 1, wherein the interactive indicator is any of:
    a hotspot;
    a hyperlink to a web page; and
    an overlay ad format.

5. The method recited in claim 1, further comprises generating instructions for and providing the instructions to a video player for when playing the video stream that causes the video player to store metadata associated with the video stream for the purposes of a user accessing at a later point in time.

6. The method recited in claim 1, wherein identifying one or more advertisement insertion points comprises:
    determining a plurality of shot breaks within the video stream;
    filtering the shot breaks to determine shot breaks that are part of a same scene and shot breaks that begin a new scene;
    identifying, as advertisement insertion points, shot breaks that begin a new scene.

7. The method recited in claim 1, wherein the user interaction is a mouse-click selecting a particular advertisement, the method further comprising:
    receiving the mouse-click selecting the associated advertisement while the video stream is playing;
    in response to the mouse-click selecting the associated advertisement:
        saving information related to the associated advertisement;
        continuing to play the video stream without playing the associated advertisement at the time of the mouse-click.

8. The method recited in claim 1, wherein the step of associating the advertisement with each of the insertion points comprises:
    determining one or more shot breaks associated with a video stream that neighbors a particular insertion point of said each insertion points;
    analyzing said one or more shot breaks that neighbor said particular insertion point to determine video content associated with the video segment;
    based on said analyzing, selecting a particular advertisement associated with said video content as an advertisement associated with said particular insertion point.

9. A non-transitory computer-readable medium storing one or more sequences of instructions which, when executed by one or more processors, causes the one or more processors to perform the method for delayed advertisement insertion, comprising:
    identifying one or more advertisement insertion points in a video stream, wherein an advertisement insertion point is a point in the video stream between two video segments wherein, when the video stream is played, the first of the two video segments occurs before the advertisement insertion point and the second video segment occurs after the advertisement insertion point;
    generating instructions for and providing the instructions to a video player for when playing the video stream that causes the video player to:
        provide an interactive indicator on a display, wherein the interactive indicator is coupled to an associated advertisement;
        in response to a user interacting with the interactive indicator while the video stream is playing:
            (a) determine an available advertisement insertion point;
            (b) delay playback of the associated advertisement until the available advertisement insertion point;
        wherein delaying playback comprises continuing to play the video stream until the available advertisement insertion point; and
        play the associated advertisement at the available advertisement insertion point.

10. The non-transitory computer-readable medium recited in claim 9, wherein identifying one or more advertisement insertion points is based in part on shot boundary detection or scale-space analysis.

11. The non-transitory computer-readable medium recited in claim 9, further comprising instructions for associating an advertisement from a set of one or more advertisements with each of the advertisement insertion points, wherein associating an advertisement from a set of one or more advertisements is based in part on using profiles of target audiences or on content of the video stream.

12. The non-transitory computer-readable medium recited in claim 9, wherein the interactive indicator is any of:
 a hotspot;
 a hyperlink to a web page; and
 an overlay ad format.

13. The non-transitory computer-readable medium recited in claim 9, further comprising instructions for causing the video player to store metadata associated with the video stream for the purposes of a user accessing at a later point in time.

14. The method of claim 8, wherein said step of analyzing comprises:
 generating object detection data that identifies an object within said video segment;
 wherein said step of selecting a particular advertisement comprises:
 searching for advertisements using said object detection data to find said particular advertisement, wherein said particular advertisement is related to said object.

15. The non-transitory computer-readable medium recited in claim 9, wherein identifying one or more advertisement insertion points comprises:
 determining a plurality of shot breaks within the video stream;
 filtering the shot breaks to determine shot breaks that are part of a same scene and shot breaks that begin a new scene;
 identifying, as advertisement insertion points, shot breaks that begin a new scene.

16. The non-transitory computer-readable medium recited in claim 9, wherein the user interaction is a mouse-click selecting a particular advertisement, the computer-readable medium further comprising instructions for:
 receiving the mouse-click selecting the associated advertisement while the video stream is playing;
 in response to the mouse click selecting the associated advertisement:
  saving information related to the associated advertisement;
  continuing to play the video stream without playing the associated advertisement at the time of the mouse click.

17. The non-transitory computer-readable medium recited in claim 9, wherein associating the advertisement with each of the insertion points comprises:
 determining one or more shot breaks associated with a video stream that neighbors a particular insertion point of said each insertion points;
 analyzing said one or more shot breaks that neighbor said particular insertion point to determine video content associated with the video segment;
 based on said analyzing, selecting a particular advertisement associated with said video content as an advertisement associated with said particular insertion point.

18. The non-transitory computer-readable medium recited in claim 17, wherein said analyzing comprises instructions for:
 generating object detection data that identifies an object within said video segment;
 wherein said selecting a particular advertisement comprises instructions for:
 searching for advertisements using said object detection data to find said particular advertisement, wherein said particular advertisement is related to said object.

* * * * *